(12) United States Patent
Wald et al.

(10) Patent No.: US 11,086,114 B2
(45) Date of Patent: Aug. 10, 2021

(54) LIGHT-SCANNING MICROSCOPE WITH SIMPLIFIED OPTICAL SYSTEM, MORE PARTICULARLY WITH VARIABLE PUPIL POSITION

(71) Applicants: Carl Zeiss Microscopy GmbH, Jena (DE); Carl Zeiss AG, Oberkochen (DE)

(72) Inventors: Matthias Wald, Jena (DE); Beate Böhme, Grosspürschütz (DE); Daniel Schwedt, Jena (DE); Tiemo Anhut, Jena (DE)

(73) Assignees: Carl Zeiss Microscopy GmbH, Jena (DE); Carl Zeiss AG, Oberkochen (DE)

(*) Notice: Subject to any disclaimer, the term of this patent is extended or adjusted under 35 U.S.C. 154(b) by 38 days.

(21) Appl. No.: 16/681,130

(22) Filed: Nov. 12, 2019

(65) Prior Publication Data
US 2020/0081237 A1    Mar. 12, 2020

Related U.S. Application Data

(62) Division of application No. 15/304,155, filed as application No. PCT/EP2015/058328 on Apr. 16, 2015, now Pat. No. 10,551,606.

(30) Foreign Application Priority Data

Apr. 17, 2014 (DE) .................. 10 2014 005 880.8

(51) Int. Cl.
*G02B 21/00* (2006.01)
*G02B 27/00* (2006.01)
(Continued)

(52) U.S. Cl.
CPC .......... *G02B 21/0072* (2013.01); *G02B 5/10* (2013.01); *G02B 21/002* (2013.01);
(Continued)

(58) Field of Classification Search
None
See application file for complete search history.

(56) References Cited

U.S. PATENT DOCUMENTS 5,691,839 A    11/1997   Kobayashi
7,295,726 B1   11/2007   Milanovic et al.
(Continued)

FOREIGN PATENT DOCUMENTS

CN    101116023    1/2008
CN    102436061    5/2012
(Continued)

OTHER PUBLICATIONS

First Office Action for Chinese Application No. 201580031361.5 dated Aug. 3, 2018, 2 pages.
(Continued)

*Primary Examiner* — Derek S. Chapel
(74) *Attorney, Agent, or Firm* — Haug Partners LLP (57) ABSTRACT

A light-scanning microscope including a scan optics for generating a pupil plane conjugate to the pupil plane of the microscope objective, and a variably adjustable beam deflection unit in the conjugate pupil plane. An intermediate image lies between the microscope objective and the scan optics. The scan optics image a second intermediate image (Zb2) into the first intermediate image via the beam deflection unit, wherein the second intermediate image is spatially curved. The deflection unit is not arranged in a collimated section of the beam path, but is instead arranged in a convergent section. Then, in terms of the optical properties and quality thereof, the scan optics needs rather to correspond merely to an eyepiece instead of a conventional scanner objective.

15 Claims, 4 Drawing Sheets

(51) Int. Cl.
*G02B 26/10* (2006.01)
*G02B 5/10* (2006.01)
(52) U.S. Cl.
CPC ..... *G02B 21/0032* (2013.01); *G02B 21/0048* (2013.01); *G02B 26/105* (2013.01); *G02B 27/0031* (2013.01); *G02B 27/0068* (2013.01)

(56) References Cited

U.S. PATENT DOCUMENTS

| | | | |
|---|---|---|---|
| 2003/0230710 | A1 | 12/2003 | Wolleschensky et al. |
| 2005/0046936 | A1 | 3/2005 | Dixon et al. |
| 2005/0270641 | A1* | 12/2005 | Hirata ................ G02B 21/0028 359/385 |
| 2006/0012871 | A1 | 11/2006 | Funk et al. |
| 2007/0253057 | A1 | 11/2007 | Potsaid et al. |
| 2009/0059357 | A1 | 3/2009 | Storz et al. |
| 2011/0284720 | A1 | 11/2011 | Wu et al. |
| 2013/0107338 | A1 | 5/2013 | Richter et al. |
| 2014/0005585 | A1 | 1/2014 | Berns et al. |
| 2014/0008549 | A1 | 1/2014 | Thériault et al. |
| 2017/0315339 | A1 | 11/2017 | Schwedt et al. |

FOREIGN PATENT DOCUMENTS

| | | |
|---|---|---|
| DE | 102 57 237 | 6/2003 |
| DE | 10 2007 039 988 | 3/2009 |
| JP | 2008-529082 | 7/2008 |
| JP | 2012-181150 | 9/2012 |
| JP | 2013-130684 | 7/2013 |
| WO | WO 90/00755 | 1/1990 |
| WO | WO 2008/037346 | 4/2008 |
| WO | WO 2013/045078 | 4/2013 |

OTHER PUBLICATIONS

Japanese Office Action for Application No. 2016-562755 dated Apr. 2, 2019, 12 pages.
International Search Report for Application No. PCT/EP2015/058328 dated Aug. 24, 2015, 2 pages.
German Search Report for Application No. 10 2014 005 880.8 dated Nov. 24, 2014, 8 pages.
Notification of Transmittal of Translation of the International Preliminary Report on Patentability dated Oct. 18, 2016 for application No. PCT/EP2015/058328 filed on Apr. 16, 2015, 13 pages.
W. J. Smith: "Modern Lens design", A resource manual, Genesee Optics Software, Inc., McGraw-Hill, 1992, chapter 22, p. 411-413.
T. R. Corle and G. S. Kino, "Confocal Scanning Optical Microscopy and Related Imaging Systems" (Academic Press, 1996, pp. 75, 77, 79, Section 2.2.7, Figure 2.2).

* cited by examiner

LIGHT-SCANNING MICROSCOPE WITH SIMPLIFIED OPTICAL SYSTEM, MORE PARTICULARLY WITH VARIABLE PUPIL POSITION

The present application is a divisional of U.S. patent application Ser. No. 15/304,155 filed on Oct. 14, 2016, which is a National Stage application of PCT/EP2015/058328 filed on Apr. 16, 2015, which claims priority from German Patent Application No. 10 2014 005 880.8 filed on Apr. 17, 2014, the disclosures of which are incorporated herein by reference in their entirety.

FIELD OF THE INVENTION

It is noted that citation or identification of any document in this application is not an admission that such document is available as prior art to the present invention.

The invention relates to a light-scanning microscope comprising an optical system, which defines an illumination beam path and comprises the following components: a light source, which provides a spatially restricted light distribution, a microscope objective comprising a (light-source-side) pupil plane and an (objective-side) focus, a scan optics (also referred to as "scan lens") for generating a pupil plane conjugate to the pupil plane of the microscope objective, and (in respect of the deflection direction) a variably adjustable beam deflection unit (for displacing the focus transversely in relation to an optical axis of the microscope objective), wherein the illumination beam path images at least one point of the light distribution and one point of the focus on one another, wherein the beam deflection unit is arranged in the conjugate pupil plane (optically between the light distribution and the scan optics) and an intermediate image lies optically between the microscope objective and the scan optics.

The invention moreover relates to a light-scanning microscope comprising an optical system which defines an detection beam path and comprises the following components: a microscope objective comprising an (output) pupil plane and an (objective-side) focus, a scan optics for generating a pupil plane conjugate to the pupil plane of the microscope objective, (in respect of the deflection direction) a variably adjustable beam deflection unit, and an optoelectronic transducer, wherein the detection beam path images at least one point of the focus and at least one respective point of the transducer on one another, wherein the (reflecting surface of the) beam deflection unit is arranged in the conjugate pupil plane (optically between the light distribution and the transducer) and an intermediate image lies optically between the microscope objective and the scan optics.

The invention moreover relates to similar light-scanning microscopes, in which the scan optics collimates beams coming from the first intermediate image in a conventional manner.

Within the meaning of the invention, the light is any form of electromagnetic radiation which is manipulable by optical means, in particular including infrared and ultraviolet radiation. For the purposes of providing the light distribution, the light source may comprise, in particular, an optical waveguide and/or a beam shaper. It may moreover comprise an intensity modulator. In particular, the optoelectronic transducer may comprise a stop that is confocal with the focus of the microscope objective. The deflection unit is also referred to as scanner.

In the prior art, such light-scanning microscopes are known, for example from "Confocal Scanning Optical Microscopy and Related Imaging Systems" by T. R. Corle and G. S. Kino (Academic Press, 1996, Section 2.2.7, FIG. 2.2). Therein, the scan optics is referred to as "scan objective". It provides a collimated conjugate pupil plane at the location of the deflection unit. The combination of scan optics and tube lens is referred to as transfer optics.

Moreover, a second variably adjustable beam deflection unit is arranged in a further pupil plane in WO 90/00755 A1, said further pupil plane being generated from a relay optics consisting of concave mirrors. A corresponding arrangement with a micro-electromechanical drive of the deflection unit is known from e.g. US 2013/107338 A1.

Arranging the deflection unit(s) in a (respective) conjugate object pupil advantageously renders possible the provision of a resting beam cross section in further conjugate pupils. As a result of this, manipulations of the wavefront with a high accuracy are possible, like in US 2003/230710 A1 or in WO 2008/037346 A1. Moreover, the marginal ray stop down by vignetting at the optics is minimal in this way.

However, the light-scanning microscopes described above are disadvantageous in that the scan optics, which is required for generating the conjugate pupil plane, is complicated and not light efficient since it needs to compensate various image aberrations, such as field curvature and transverse chromatic aberration, in order to allow a high imaging quality. Moreover, there is little available installation space for the deflection unit due to the small distance between the conjugate pupil plane and the scan optics.

SUMMARY OF THE INVENTION

The invention is based on the object of improving a microscope of the type set forth at the outset such that the scan optics can have a simpler design and it is possible to provide more installation space for the deflection unit.

According to the invention, provision is made for the scan optics to image a second intermediate image into the first intermediate image via the (reflecting surface of the) beam deflection unit or for the scan optics to image the first intermediate image into the second intermediate image via the (reflecting surface of the) beam deflection unit, wherein the second intermediate image is spatially curved in both cases. Therefore, in contrast to the prior art, the (reflecting surface of the) deflection unit is no longer arranged in a collimated section of the detection beam path, but in a convergent section instead. A virtual object lies downstream of the beam deflection unit due to the reflection at the reflecting surface of the deflection unit. The spatial curvature of the intermediate image allows the provision of the conjugate pupil plane by means of a scanning optics which has been significantly simplified in comparison with the conventional, collimating scanning objectives, in particular without correction of the curvature of field, with, nevertheless, the same imaging quality of the overall optical system. This makes it possible to dispense in particular with the (near field) lenses with negative focal distance/refractive power which were previously conventional for planarization (W J. Smith: "Modern Lens design", McGraw-Hill, 1992, chapter 22, page 411). In terms of the optical properties and quality thereof, such a scan optics needs rather to correspond merely to an eyepiece instead of a conventional scanner objective. The radius of curvature of the second intermediate image then preferably corresponds to the distance between the deflection unit and the focal position of the first intermediate image. Additionally, the correction of the transverse chromatic aberration can also be divided among the scan optics and the tube lens within the meaning of a compensation system, meaning a further simplification of the scan optics. Expediently, the microscope can have such an embodiment that the scanning optics and the tube lens compensate one another in respect of the transverse chromatic aberration.

This arrangement is particularly advantageous in the case of a nonlinear interaction of the excitation radiation with the sample. Here, the quadratic dependence (in the case of the two-photon excitation) or cubic dependence (in the case of the excitation of the third harmonic or the three-photon excitation) of the light emission in the sample on the intensity in the case of the conventional arrangement of a plurality of beam deflection units in a respective pupil in such a way that the deflection units are not imaged on one another leads to problems in the image field illumination. The physical distance of the deflection units upstream of the scan objective will be imaged into the objective pupil with an axial magnification which increases quadratically with a lateral magnification. This leads to a non-stationary pupil, which results in a field-dependent excitation intensity. These problems in nonlinear optics (NLO) can be avoided by arranging the beam deflection unit in a non-collimated pupil since this allows good imaging of the deflection units on one another in a light-efficient arrangement. Typically, the detection of the fluorescence in this case is not brought about by way of the beam deflection unit, but already upstream in the so-called "non-descanned" beam path section. However, since the arrangement is equally effective in the excitation direction as in the detection direction, clean imaging of the pupils is also obtained in this case.

Preferably, the second intermediate image is spherically curved or at least substantially spherically curved, in particular with a radius of curvature between the single focal length and twice the focal length of the scan optics. Preferably, the radius of curvature of the intermediate image is identical to a distance between (a center point of the reflecting surface of) the deflection unit and the second intermediate image.

Advantageously, a center of the curvature of the second intermediate image may lie in a beam deflection unit, in particular on a reflecting surface of the relevant beam deflection unit.

Expediently, the light-scanning microscope may comprise an illumination optics for imaging the light distribution into an intermediate image, in particular into the second intermediate image or into a third or further intermediate image, and/or a detection optics for imaging an intermediate image, in particular the second intermediate image or a third or further intermediate image, into the transducer.

In particular, the optical system may comprise a beam splitter which is arranged in the illumination beam path and in the detection beam path in such a way that light coming from the focus is decoupled to the optoelectronic transducer from the illumination beam path.

Expediently, the optical system may comprise a collimation optics (in the illumination beam path or in the detection beam path) on a side of the beam deflection unit distant from the scan optics. In this manner, further manipulations on the beams and the final detection are possible with little outlay.

Preferably, (exactly) one concave mirror, the center of curvature of which lies in the conjugate pupil plane, lies optically between the beam deflection unit and the light source or the transducer, in particular as a collimation optics. The concave mirror has an achromatic effect. In this manner, a further conjugate pupil plane can be provided with little optical outlay, in particular with a small number of interfaces. By arranging the concave mirror at the distance of the radius of curvature thereof from the first conjugate pupil, it is possible to provide (via a curved second intermediate image) a highly precise image at the same distance, independently of the field angle.

Advantageously, a radius of curvature $R_H$ of the concave mirror may be twice the size of a radius of curvature $R_{ZB}$ of the second intermediate image such that plane wavefronts are present downstream of the concave mirror (on the transducer side). In this way, the second conjugate pupil lies in a collimated beam path section and the beam diameters in the two conjugate pupils are the same. Expediently, the concave mirror is then arranged in such a way that rays coming from the focus of the microscope objective (through the second intermediate image) extend parallel to one another downstream of the concave mirror, preferably also parallel to a plane within which the first deflection unit is able to deflect incoming light, and at an angle in relation to a central axis of the concave mirror. The distance A between concave mirror and the curved intermediate image then equals the radius of the intermediate image $R_H$: $R_H=2 \cdot R_{ZB}=2 \cdot A$. Thus, in conjunction with the curved second intermediate image, a particularly high imaging quality of the optical system is possible with little outlay. However, there may also be wavefront curvatures differing from zero downstream of the concave mirror if the concave mirror radius of curvature $R_H$ deviates from twice the intermediate image radius $R_{ZB}$ by a difference D. For the concave mirror radius $R_H=2 \cdot R_{ZB}+D$, the distance A between concave mirror and intermediate image is $A=R_{ZB}+D$ and the second deflection unit is arranged at the center of curvature of the concave mirror, i.e. at a distance $R_H$ therefrom. Furthermore, the beam diameters on the first beam deflection unit and on the second beam deflection unit may be unequal, for example in the case of an imaging scale not equal to 1:1.

However, the radius of curvature $R_H$ of the concave mirror may also deviate from twice the radius of curvature $R_{ZB}$ of the intermediate image. A concave mirror with the radius of curvature $R_H=A$ is then arranged at the distance A/2 from the curved intermediate image such that the light on the optical axis is collimated (when the beam deflection units are in the mid-positions thereof) and the light outside extends in a slightly divergent or convergent manner.

Preferably, the concave mirror, in particular the reflecting surface thereof, has a toric form (surface form of a toroidal section), with the invention also comprising other forms. As a result, the astigmatism resulting from oblique incidence can be reduced. Here, the concave mirror preferably has a first radius of curvature, which is smaller than twice the radius of curvature of the intermediate image by a factor cos (angle of incidence), and a second radius of curvature, which is greater than twice the radius of curvature of the intermediate image by a factor cos(angle of incidence). Preferably, the first curvature belonging to the first radius of curvature extends about an axis which is parallel to an axis of rotation of the first beam deflection unit and the curvature belonging to the second radius of curvature is orthogonal to the first curvature.

A second aspect of the invention relates to a light-scanning microscope of the type set forth at the outset, in which the scan optics collimates beams, which come from the first intermediate image and originate from the focus, like in the prior art. It solves the problem of being able to set the position of a conjugate objective pupil relative to the beam deflection unit. Under this aspect, the invention provides for a converging optics to be optically arranged between the beam deflection unit and the transducer or the light source, said converging unit focusing the collimated beam coming from the beam deflection unit into a second intermediate image, wherein the scan optics and the converging optics are displaceable along an optical axis of the detection beam path. Here, the scan optics and the converging optics form a finite relay optics. Here, the displaceability renders possible the above-described advantages of adaptability to different microscope objectives; however, the correction of curvature and lateral chromatic aberrations is expedient, like in the prior art. An electric drive for displacing the scan optics and/or the converging optics may be provided. In particular, these may be separate drives for scan optics and converging optics. Here, provision may be made of a control unit which is configured to displace the scan optics and the converging optics in the same sense, in particular over the same distance, in particular in a synchronous or simultaneous manner.

Advantageous embodiments which are able to be used in all aspects of the invention are described below.

In preferred embodiments, a second variably adjustable beam deflection unit or a variably adjustable wavefront modulator is arranged in a further conjugate pupil plane between the first beam deflection unit and the transducer, for example like in WO 2008/037346 A1. In particular, the further conjugate pupil plane can be the second pupil plane generated by a concave mirror, or a third pupil plane. The second beam deflection unit may have an axis of rotation which differs from an axis of rotation of the first beam deflection unit. As a result, a two-dimensional field can be scanned on the sample side. Alternatively, the axis of rotation of the second beam deflection unit may be parallel to an axis of rotation of the first beam deflection unit. As a result, one of the two beam deflection units can serve for an approximate setting and the other one can serve for a fine setting of the beam deflection. Moreover, already the first beam deflection unit, optionally the second beam deflection unit too, may provide a variable deflection in two dimensions. Alternatively, both beam deflection units may each be adjustable about precisely one respective axis of rotation in advantageous embodiments, in particular by way of drives that differ from one another or by way of the same drives in different modes of operation. By way of example, both beam deflection units may be embodied as galvanometric scanners, of which only one is operated with resonant oscillation.

By way of example, precisely one of the two beam deflection units may comprise a resonantly oscillating mirror ("resonance scanner"). In this way, it is possible to scan a line on the sample by means of the resonantly oscillating mirror, which line may be scanned additionally in the longitudinal or transverse direction by means of the other beam deflection unit or in the longitudinal and transverse direction in the case of two-dimensional adjustability.

An adjustment of the sample-side focal plane along the optical axis (in the z-direction) and hence scanning of a sample in the depth is possible by means of the wavefront modulator within the maximum modulation lift provided thereby. In conjunction with a two-dimensionally variable first beam deflection unit, this enables a three-dimensional displacement of the measurement location and hence three-dimensional scanning of the sample. As an alternative to the displacement of the focus along the optical axis, a spatially resolved adjustable wavefront modulator may also be used to compensate location-dependent imaging aberrations, which e.g. arise from local variations of one or more sample properties.

To this end, the light-scanning microscope may comprise a control unit which records at least one image of a sample and obtains control values for the wavefront modulator (and sets the wavefront modulator accordingly) on the basis of at least one predetermined property of the sample which influences the image, in particular an actual distribution of a property in the sample, and on the basis of the image. In particular, the control unit can establish a measured distribution of the sample property on the basis of the image and obtain the control values in such a way that a deviation between the measured distribution and the actual distribution is minimal, for example by means of curve fitting.

Configurations in which some, or all, of the scan optics is displaceable along an optical axis of the detection beam path are particularly preferred. In particular, they may comprise an electric drive for displacing the displaceable part of, or the entire, scan optics. As a result of the axial displacement, the position of the conjugate pupil relative to the first deflection unit is able to be set with little outlay, whereas, previously, the position of the scan objective was only set and fixed once on the beam deflection unit for adjusting the focal position and hence for adjusting the collimation. As a result of this, it is possible, in particular, to compensate a pupil shift, which occurs e.g. when interchanging the microscope objective. Here, the axial position of the conjugate pupil varies with the square of the imaging scale between first deflection unit and objective pupil. Here, the focal position in the intermediate image plane, and hence also in the object plane, are largely maintained.

Preferably, the scan optics is embodied in such a way that the imaging thereof (from the first intermediate image into the second intermediate image) has a magnification factor of between 0.8 and 1.2, in particular of between 0.9 and 1.1, in particular of exactly 1. In this way, the position of the first intermediate image, and hence the sample-side focal plane, remains constant with a high accuracy. The focus is maintained best in the case of 1:1 imaging of the scan optics from the virtual object to the first intermediate image (parabolic extent of the focal offset).

Embodiments in which the microscope objective is arranged in a manner displaceable along the optical axis and/or in an objective changer, in particular comprising an electric drive for displacing the microscope objective and/or for interchanging the microscope objective, are advantageous. As a result, great flexibility when measuring with an unchanging high imaging quality is rendered possible in conjunction with the adaptability to the different pupil positions of different objectives.

Preferably, the first beam deflection unit and/or the second beam deflection unit have/has a micro-electromechanical system for setting the beam deflection. Like in U.S. Pat. No. 7,295,726 B1, this may provide rotatability about two different axes, in particular with the position of the (stationary) point of intersection of these axes in a reflecting surface (deflecting the beam coming from the scan optics), in particular with the arrangement of this point of intersection on the optical axis of the detection beam path. MEMS-based scanners have a significantly lower mirror mass and, as a result thereof, have the advantage of being able to be tilted quickly in any way and with high accuracy. By way of example, one of the beam deflection units may be a MEMS-based mirror which is only adjustable about exactly one axis of rotation and the other beam deflection unit may be a galvanometric scanner. Here, the galvanometric scanner may also be operated resonantly.

In particular, the invention also comprises light-scanning microscopes with a light source, the light of which is able to be coupled or is coupled optically into the microscope objective via the first beam deflection unit by means of a beam splitter arranged in the detection beam path. Expediently, the light source is a laser. By way of example, it may be a tunable laser.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
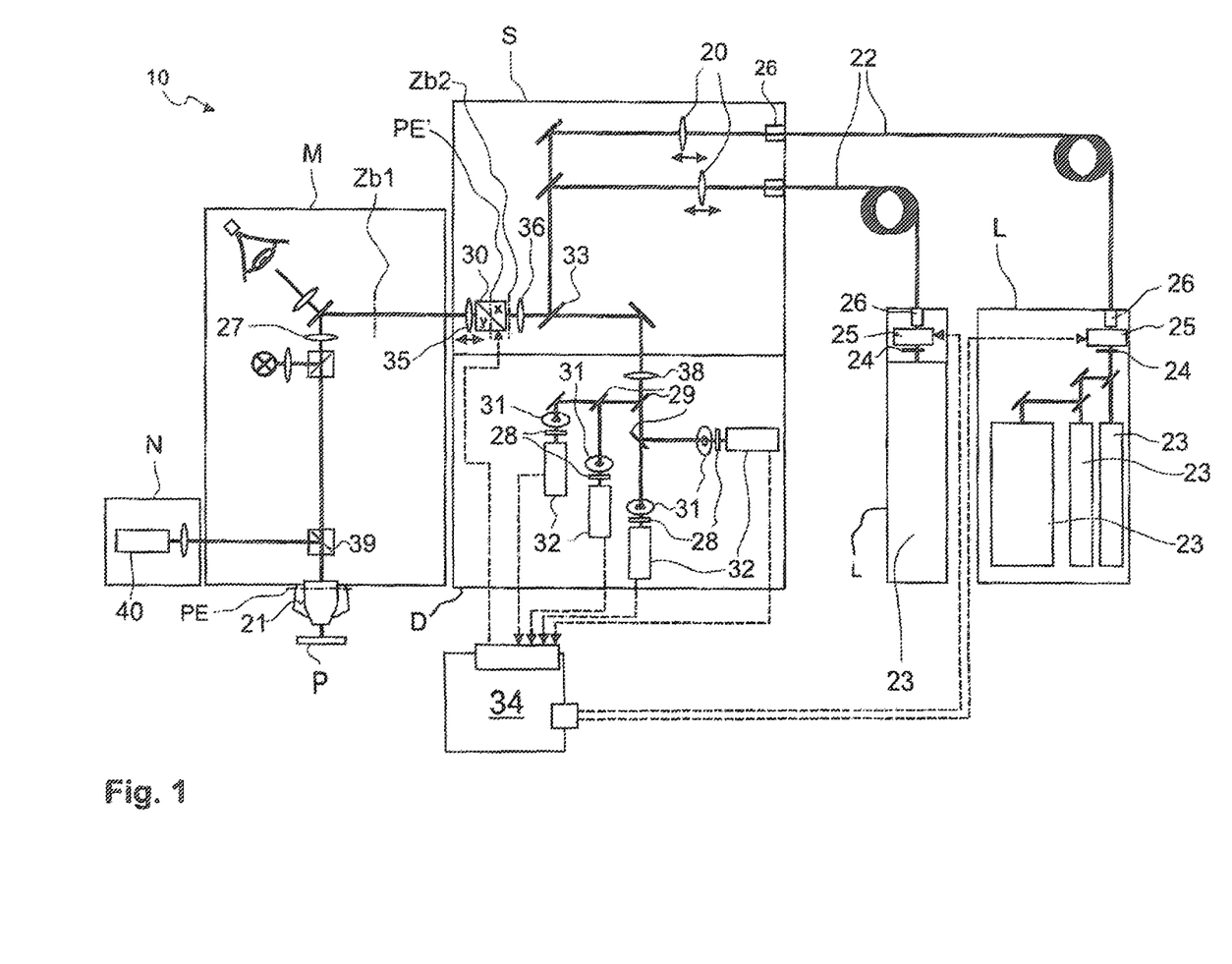
FIG. 1 shows a light-scanning microscope.

FIG. 1 is a schematic illustration of a light-scanning microscope 10 ("LSM") which is controlled by means of the control unit 34. The LSM 10 is put together in a modular manner from two illumination modules L with lasers 23, a scanning module S, a detection module D and the microscope unit M with the microscope objective 21. The microscope unit M comprises e.g. an objective revolver for swiveling in different microscope objectives 21.

The light from the lasers 23 can be influenced by light doors 24 and attenuators 25 by way of the control unit 34 before it is fed into, and unified in, the scanning unit S by way of fiber optical waveguides 22 and coupling optics 20, for example in the form of collimation optics. The combination of each laser 23 with the optics up to the respective fiber optical waveguide 22 can be considered to be a respective light source, which provides a confocal, punctiform light distribution, which is imaged in the sample P, at the end of the relevant fiber optical waveguide 22.

By way of the principal beam splitter 33 and the beam deflection unit 30, which is variably adjustable in X- and Y-direction and has a single mirror with an MEMS drive (not depicted here), the excitation light reaches the microscope objective 21, which focuses the light in the sample P in the measuring location (not depicted here). Excitation light scattered back from the sample P or emitted fluorescence light reaches the detection module D through the microscope objective 21, the tube lenses 27 and the scan optics 35, via the deflection unit 30, through the collimation optics 36 and the principal beam splitter 30. For the purposes of the fluorescence detection, the principal beam splitter 30 may be embodied e.g. as a dichroic color splitter ("principal color splitter") such that the back-scattered excitation light is mirrored out in the direction of the lasers 23.

Downstream of a detection optics 38, for example a converging lens, the detection module D comprises a plurality of detection channels, each with a pinhole 31, a filter 28 and a photomultiplier 32 as an optoelectronic transducer, which are spectrally separated by color splitters 29 ("secondary color splitters"). It is also possible to use slot diaphragms (not depicted here) instead of pinholes 31, for example in the case of a line-shaped illumination. The detection optics 38 focuses the previously collimated beams onto the confocal pinholes 31. The confocal pinholes or slot diaphragms 31 serve to discriminate sample light which does not originate from the focus volume at the measurement location. Therefore, the photomultipliers 32 only detect light from the focal volume and thus define the measurement location in the sample P, from which light is recorded and detected at the detection location in the respective light-sensitive layer of the photomultipliers 32. Alternatively, it is also possible to use other light-sensitive sensors known from the prior art, such as avalanche diodes.

The measurement volume of the sample P, which is recorded and illuminated confocally, is able to be moved over the sample P by means of the deflection unit 30 in order to record an image pixel-by-pixel by virtue of the MEMS mirror of the deflection unit 30 being twisted in a targeted manner. Both the movement of the MEMS mirror 30 and the switching of the illumination by means of the light doors 24 or the attenuators 25 are controlled directly by the control unit 34. Recording data from the photomultipliers 32 is effected by the control unit 34.

The microscope objective 21 has an infinite back focal length such that e.g. a collimated beam path is present up to the tube lens 27. Situated within the microscope objective 21 is the (output) pupil plane PE thereof. The tube optics 27 generates a first intermediate image Zb1, which is imaged into a second intermediate image Zb2 by the scan optics 35. The pupil plane PE' conjugate to the pupil plane PE lies on the beam deflection unit 30. As a result, the beam deflection unit 30 lies in a convergent section of the detection beam path. Subsequently, the collimation optics 36 images the second intermediate image Zb2 to infinity such that only collimated beams are present at the principal beam splitter 33. In alternative embodiments (not depicted here), convergent or divergent beams may be present at the principal beam splitter 33. The coupling optics 20 in the scanning module S and the detection optics 29 should then be adapted appropriately.

By way of example, the scan optics 35 is displaceable along the optical axis of the unified detection and illumination beam path by means of a drive. As a result of this, the position of the conjugate pupil plane PE' can be kept axially on the beam deflection unit 30, even in the case of a change in the pupil plane PE in the case of an interchange, or an axial displacement, of the microscope objective 21.

A module N ("NLO detection module") for detecting fluorescence after the nonlinear interaction in the case of the excitation is connected to an additional output provided by a beam splitter 39 (also referred to as "NLO beam splitter"). It is possible to connect the NLO detection module N and use the latter for the measurement as an alternative, or in addition, to the detection module D. In alternative embodiments (not depicted here), an independent NLO detection module with a dedicated microscope objective may be arranged on the opposite side of the sample, and used for the detection, as an alternative, or in addition, to the NLO detection module N.

Figure 2:
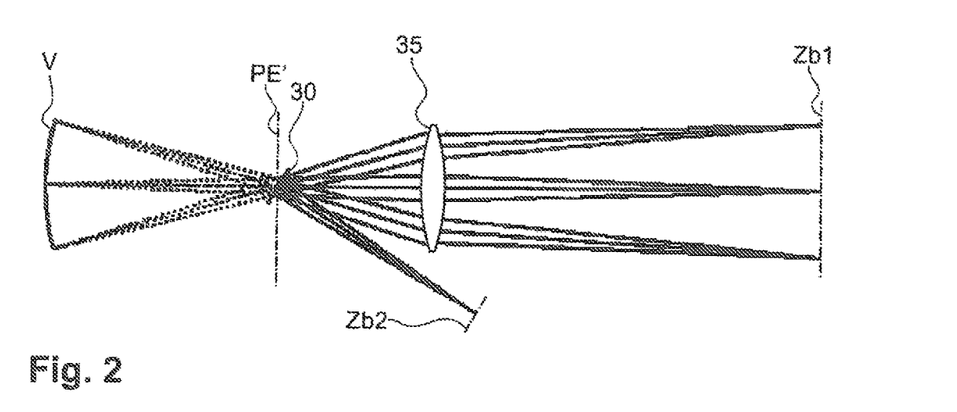
FIG. 2 shows a simplified scan optics as scan objective.

FIG. 2 depicts the beam paths around the scan optics 35, which replaces a conventional, complicated scan objective by virtue of imaging the first intermediate image Zb1 into a second intermediate image Zb2, in detail for three different positions of the beam deflection unit 30. The scan optics 35 is free from a curvature-of-field correction and has an imaging scale of 1:1. It is possible to identify that the second intermediate image Zb2 is spatially curved on the basis of the virtual object V behind the beam deflection unit 30 arranged in the conjugate pupil PE'.

Figure 3:
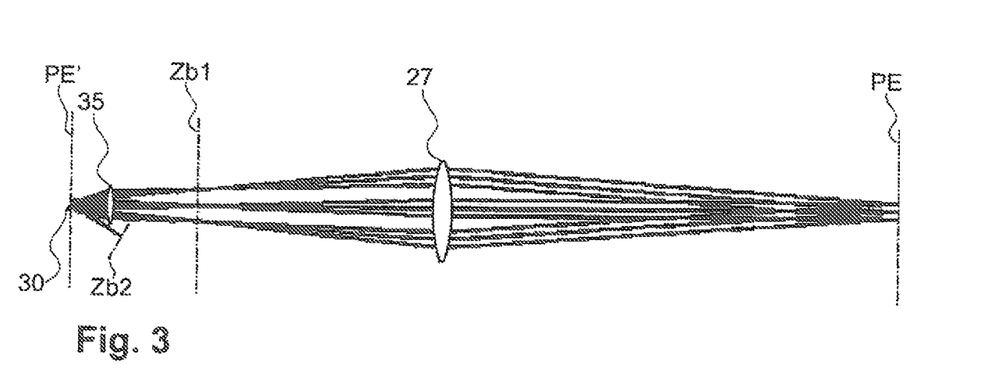
FIG. 3 shows a complete transfer optics.

FIG. 3 shows the complete transfer optics which, in addition to the scan optics 35 and the beam deflection unit 30 from FIG. 2, also comprises a tube optics 27. The beam paths from the actual pupil plane PE of the microscope objective (not depicted here) to the second intermediate image Zb2 are once again depicted for three different positions of the deflection unit 30. The tube optics 27 focuses the collimated beam coming from the pupil PE into the first intermediate image Zb1, which images the scan optics 35 into the spatially curved second intermediate image Zb2 via the beam deflection unit 30, which is arranged in the conjugate pupil PE'.

Figure 4A:
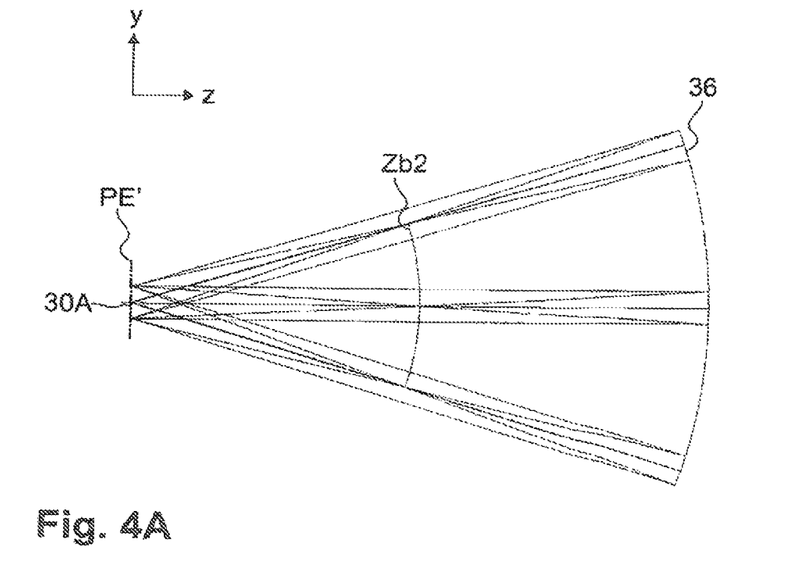
FIGS. 4A, 4B, and 4C show, in three different views, an extended transfer optics with an additional pupil plane.
Figure 4B:
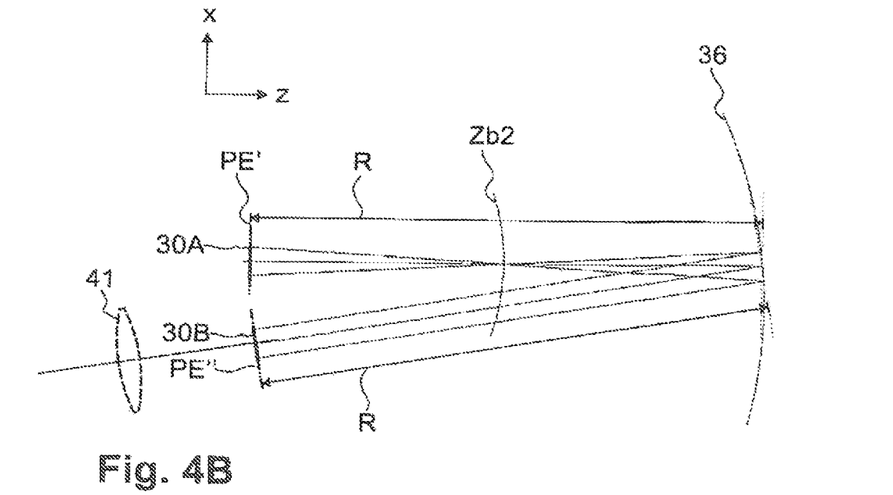
Figure 4C:
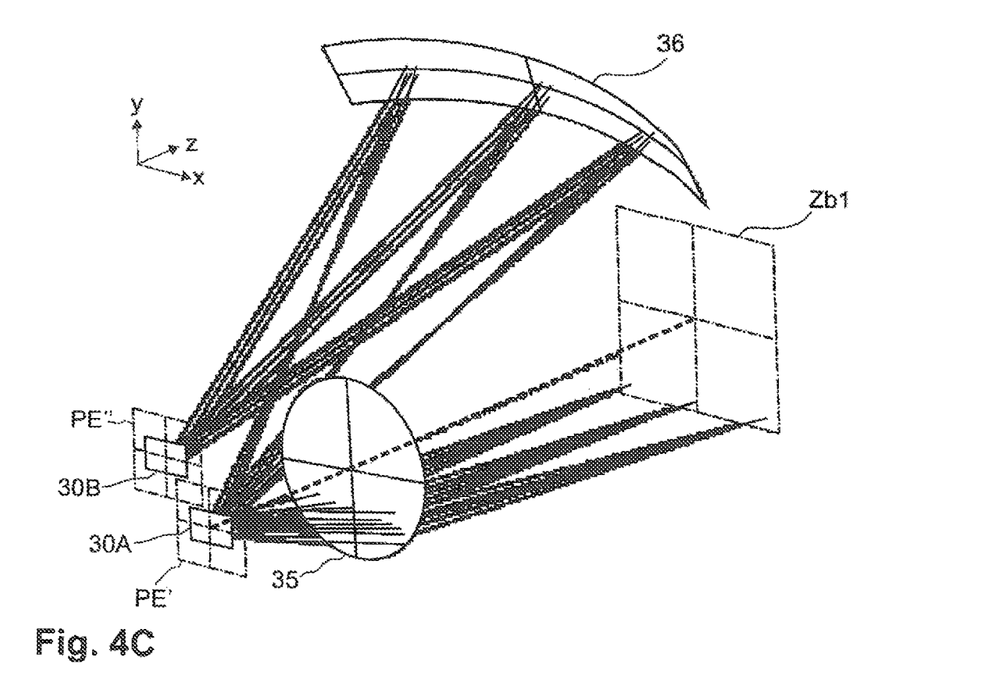

FIG. 4 depicts, in three different views (FIGS. 4A, 4B, 4C), an extended transfer optics with a second conjugate pupil plane PE" and a second variably adjustable beam deflection unit 30B. This extended transfer optics replaces e.g. the afocal relay optics according to Kessler, known from the literature, as described in e.g. US 2010/0208319 A1 or WO 90/00755 A1.

By way of example, the first beam deflection unit 30A is a single mirror with a MEMS drive, which is rotatable about two mutually orthogonal, stationary axes. The stationary point of rotation of the mirror lies in the reflecting surface of the mirror on the optical axis of the transfer optics. By way of example, the second beam deflection unit 30A is a single mirror with a galvanometric drive, i.e. it has only exactly one axis of rotation. By way of example, it can be operated in resonant oscillation. Alternatively, it is also possible to insert galvanometric beam deflection units, of which one can move the light in the sample in the x-direction and the other one can move it in the y-direction, into both conjugate pupil planes PE' and PE".

The additional pupil plane PE" is provided by a collimation optics 36, which e.g. is configured as a toric concave mirror and arranged optically between the first beam deflection unit 30A and the second beam deflection unit 30B. The first center of curvature of the concave mirror lies in the first conjugate pupil plane PE' on the reflecting surface of the first beam deflection unit 30A (distance R between concave mirror and conjugate pupil PE') and the associated radius of curvature of the concave mirror is twice the size of the radius of curvature of the second intermediate image Zb2. As a result, firstly, there is a perfect, plane image of the first conjugate pupil PE' (at the identical distance R) in the second conjugate pupil PE", independently of the respective field angle, and, secondly, the rays in the second conjugate pupil PE" are collimated in such a way that plane wavefronts are present there. As a result, handling the rays in the further course of the detection beam path is simple. In alternative embodiments (not depicted here), the radii of curvature of concave mirror and second intermediate image may deviate from one another such that non-planar wavefronts are present in the second pupil PE".

Since the concave mirror 36 would image the first conjugate plane PE' onto itself in the case of perpendicular light incidence, said concave mirror is tilted perpendicular to the plane in which the second beam deflection unit 30B acts. As a result of the oblique incidence onto the concave mirror, the latter generates an astigmatism, which is compensated to the greatest possible extent by the toric form. For this purpose, the radius of curvature along the y-axis is reduced in relation to the radius of curvature of the second intermediate image Zb2 by the factor cos (angle of incidence) and the radius of curvature along the x-axis is increased in relation to the radius of curvature of the second intermediate image Zb2 by the same factor.

Instead of the second beam deflection unit 30B, a wavefront modulator 30B may be arranged in the second conjugate pupil plane PE" or, preferably, in a third conjugate pupil plane (not depicted here).

As an alternative to the toric form, the concave mirror 36 may have a spherical form, in which the first center of curvature and second center of curvature are identical. Then, a cylindrical optics 41, for example in the form of a weak cylindrical lens, may be arranged on the side of the concave mirror 36 distant from the scan optics 35 for the purposes of compensating the astigmatism resulting from the oblique incidence on the concave mirror 36. Preferably, the cylindrical optics 41 may be arranged on the side of the second beam deflection unit 30B distant from the scan optics 35, i.e. in the so-called "de-scanned" beam path section. The cylindrical optics 41 may be dispensed with in the case of a toric concave mirror 36.

If the first beam deflection unit is two-dimensional, i.e. adjustable for deflection in the x-direction and y-direction, the collimation optics may be e.g. a simple lens.

Figure 5:
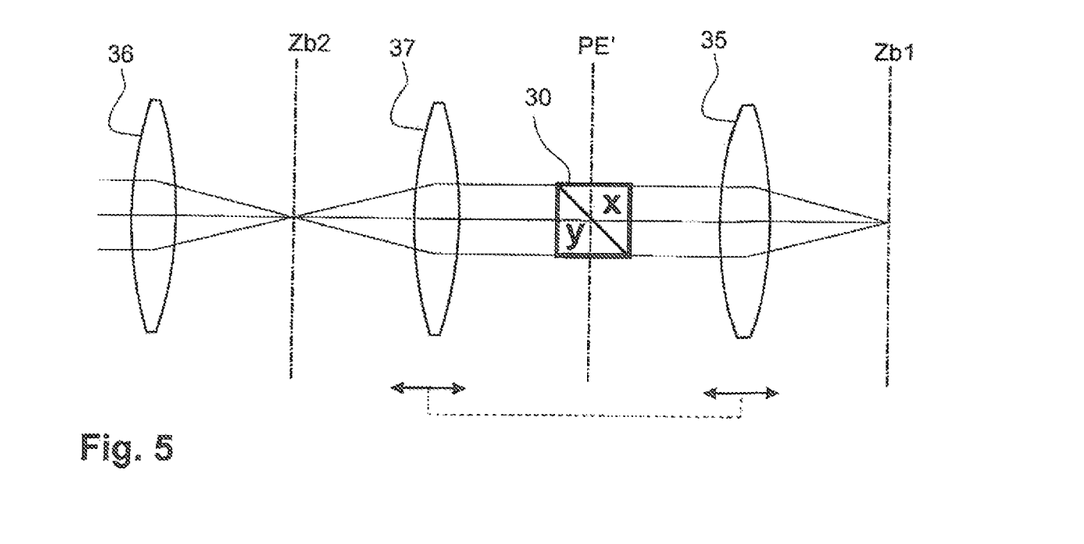
FIG. 5 shows a scan optics with a finite relay optics.
In all of the drawings, parts that coincide bear the same reference signs.

Finally, FIG. 5 shows an alternative transfer optics. The beams are collimated like in the prior art in the region of the beam deflection unit 30, which is arranged in a conjugate pupil plane PE'. The scan optics 35 and the converging optics 37 disposed downstream of the beam deflection unit 30 form a finite relay optics, which images the first intermediate image Zb1 into the second intermediate image Zb2. A collimation optics 36 is arranged in the further course such that e.g. collimated beams are present at the principal beam splitter 33. In other embodiments (not depicted here), a plurality of principal beam splitters may, for example, only follow after a further converging optics.

The scan optics 35 and the converging optics 37 are axially displaceable for adapting to the pupil shift when changing or displacing the microscope objective 21. The displacement of both optics 35, 37 is performable by means of a control unit, for example always in the same sense and over the same distance, optionally also in a synchronous manner.

The described arrangement of the beam deflection unit in a non-collimated beam path section may be used for further applications, for example for optical manipulation of the sample or for deflection of beams which are generated by means of a beam shaping optics, for example a spatial light modulator (SLM), for example Bessel beams or Mathieu beams.

In alternative embodiments (not depicted here), the object-side focus may have a form deviating from that of a point. By way of example, it may have the form of a line.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE SIGNS

10 Light-scanning microscope
20 Coupling optics
21 Microscope objective
22 Fiber optical waveguide 23 Laser
24 Light door
25 Attenuator
26 Fiber coupler
27 Tube lens
28 Filter
29 Color splitter
30 Beam deflection unit
31 Stop
32 Photomultiplier
33 Principal beam splitter
24 Control unit
35 Scan optics
36 Collimation optics
37 Converging optics
38 Detection optics
39 NLO beam splitter
40 NLO detector
41 Cylindrical optics
D Detection module
L Illumination module
M Microscope unit
N NLO detection module
P Sample
PE('/") (Conjugate) pupil plane
R Distance
S Scan module
V Virtual object
Zb1/2 Intermediate image plane

The invention claimed is:

1. A light-scanning microscope comprising:
an optical system that defines an illumination beam path and comprises the following components:
a light source that provides a spatially restricted light distribution;
a microscope objective comprising a pupil plane and a focus;
a scan optics configured to generate a pupil plane conjugate to the pupil plane of the microscope objective; and
a variably adjustable beam deflection unit;
wherein the illumination beam path is configured to image at least one point of the light distribution and at least one respective point of the focus on one another;
wherein the beam deflection unit is arranged in the conjugate pupil plane and an intermediate image lies optically between the microscope objective and the scan optics;
wherein the optical system is configured so that the illumination beam path is collimated in the conjugate pupil plane;
wherein a converging optics is optically arranged between the beam deflection unit and the light source, said converging optics focusing the collimated beam coming from the beam deflection unit into a second intermediate image; and
wherein the scan optics and the converging optics are displaceable along an optical axis of the illumination beam path.

2. The light-scanning microscope as claimed in claim 1, further comprising:
a control unit that is configured to displace the scan optics and the converging optics in the same sense.

3. The light-scanning microscope as claimed in claim 1, further comprising:
a detection optics configured to image the second intermediate image.

4. The light-scanning microscope as claimed in claim 1; wherein the second intermediate image is spherically curved or at least substantially spherically curved.

5. The light-scanning microscope as claimed in claim 4; wherein a center of curvature of the second intermediate image lies in the beam deflection unit.

6. The light-scanning microscope as claimed in claim 1; wherein the optical system, in the illumination beam path, further comprises:
a collimation optics providing a parallel beam path section on a side of the beam deflection unit distant form the scan optics.

7. The light-scanning microscope as claimed in claim 1; wherein a concave mirror, the center of curvature of which lies in the conjugate pupil plane, is arranged optically between the beam deflection unit and the light source.

8. The light-scanning microscope as claimed in claim 7; wherein a radius of curvature of the concave mirror is twice the size of a radius of curvature of the second intermediate image.

9. The light-scanning microscope as claimed in claim 1; wherein an image of the scan optics has a magnification factor of between 0.8 and 1.2.

10. The light-scanning microscope as claimed in claim 1, further comprising:
an illumination optics configured to image the light distribution into an intermediate image.

11. The light-scanning microscope as claimed in claim 1; wherein a second variably adjustable beam deflection unit or a variably adjustable wavefront modulator is arranged in a further conjugate pupil plane, optically between the first beam deflection unit and the light source.

12. The light-scanning microscope as claimed in claim 11; wherein the variably adjustable wavefront modulator is arranged in the further conjugate pupil plane, optically between the first beam deflection unit and or the light source; and
wherein the light-scanning microscope further comprises:
a control unit that is configured to record at least one image of a sample and obtain control values for the wavefront modulator based on at least the recorded image.

13. The light-scanning microscope as claimed in claim 1; wherein the microscope objective is arranged in a manner displaceable along the optical axis and/or in an objective changer.

14. The light-scanning microscope as claimed in claim 1; wherein the beam deflection unit and/or a second beam deflection unit comprises a micro-electromechanical system configured to adjust the beam deflection.

15. The light-scanning microscope as claimed in claim 1; wherein the microscope objective has an infinite back focal length; and wherein the optical system further comprises:
a tube optics configured to generate the first intermediate image optically between the scan optics and the tube optics.

* * * * *